(12) United States Patent
Hotto

(10) Patent No.: US 8,047,006 B2
(45) Date of Patent: *Nov. 1, 2011

(54) ENHANCED EFFICIENCY TURBINE

(75) Inventor: Robert Hotto, Carlsbad, CA (US)

(73) Assignees: Energyield LLC, Carlsbad, CA (US), part interest; John L. Rogitz, San Diego, CA (US), part interest ( * ) Notice: Subject to any disclaimer, the term of this patent is extended or adjusted under 35 U.S.C. 154(b) by 0 days.

This patent is subject to a terminal disclaimer.

(21) Appl. No.: 12/890,330

(22) Filed: Sep. 24, 2010

(65) Prior Publication Data
US 2011/0146295 A1 Jun. 23, 2011

Related U.S. Application Data

(63) Continuation of application No. 12/641,626, filed on Dec. 18, 2009, now Pat. No. 7,818,969.

(51) Int. Cl.
*F02C 6/18* (2006.01)
(52) U.S. Cl. .......................... 60/780; 60/801
(58) Field of Classification Search ............... 60/39.12, 60/698, 716, 780, 801; 429/412, 417, 419
See application file for complete search history.

(56) References Cited

U.S. PATENT DOCUMENTS

| | | | |
|---|---|---|---|
| 5,678,647 A | 10/1997 | Wolfe et al. | |
| 6,392,313 B1 | 5/2002 | Epstein et al. | |
| 6,605,376 B2 | 8/2003 | Verykios | |
| 6,868,677 B2 | 3/2005 | Viteri et al. | |
| 2006/0063046 A1 | 3/2006 | Hu et al. | |
| 2008/0118800 A1 | 5/2008 | Devriendt et al. | |

OTHER PUBLICATIONS

U.S. Climate Change Technology Program—Technology Options for the Near and Long Term. "2.1.3 High-Efficiency Gas Fuel Cell/ Hybrid Power Systems Technology Description", Nov. 2003, p. 66-68.
Hossein Ghezel-Ayagh, "Thrust Area: Hybrid Fule Cell/ Turbine Power Systems", http://www.fuelcellenergy.com/files/Hybrid%20Power%20System%20Thrust%20Area.pdf.
Professor Soctt Smauelsen, "Fule Cell/Gas Turbine Hybrid Systems", 2004 ASME International Gas Turbine institute http://files.asme.org/IGTI/Knowledge/Articles/13043.pdf.

*Primary Examiner* — William Rodriguez
*Assistant Examiner* — Phutthiwat Wongwian
(74) *Attorney, Agent, or Firm* — John L. Rogitz

(57) ABSTRACT

Hydrocarbon fuel is sent to a reformer, which produces carbon and hydrogen. The hydrogen is sent to a fuel cell which uses it to generate electricity, and the electricity is used to actuate an electric motor that is coupled to an output shaft of a turbine to impart torque to the shaft. Additionally, hydrocarbon fuel can be provided to the turbine intake directly and/or carbon from the reformer can be mixed with steam from the fuel cell and sent to the turbine intake, in either case to impinge on the turbine blades and impart further torque to the output shaft.

12 Claims, 2 Drawing Sheets

ENHANCED EFFICIENCY TURBINE

This is a continuation of and claims priority to U.S. patent application Ser. No. 12/641,626, filed Dec. 18, 2009, now U.S. Pat. No. 7,818,969.

FIELD OF THE INVENTION

The present invention relates generally to using fuel cells to actuate turbines.

BACKGROUND OF THE INVENTION

The importance of energy conservation goes without saying. Not only must fossil fuels be conserved for future use, but limiting the amount of fossil fuels that must be burned appears to be highly beneficial for the environment. Hence, the present invention.

SUMMARY OF THE INVENTION

Accordingly, a system includes a reformer receiving hydrocarbon fuel and outputting a stream of hydrogen and a stream of carbon separate from the stream of hydrogen. A fuel cell receives hydrogen output by the reformer but the fuel cell does not receive the stream of carbon. The fuel cell provides a first energy output and an output of water vapor which is mixed with carbon output by the reformer to provide a mixture. The mixture is directed against blades of a turbine to impart torque to an output shaft of the turbine while the first energy output of the fuel cell is also used to impart torque to the output shaft of the turbine.

In example embodiments the mixture further includes a surfactant. If desired, the output shaft of the turbine can be coupled to a generator to cause the generator to output electricity when the output shaft is rotated, or the turbine can be used to propel a vehicle to move.

The first energy output of the fuel cell may be connected to an electric motor and the electric motor coupled to a rotor coupling in the turbine, with the first energy output actuating the electric motor. In some embodiments the hydrocarbon fuel is provided to an intake of the turbine in addition to being provided to the reformer. Also, if desired the fuel cell can be electrically connected to a turbine ignition component to provide ignition energy thereto.

In another aspect, a system includes a turbine including an output shaft and a fuel cell providing output that is coupled to the turbine so as to impart torque to the output shaft.

In another aspect, a method includes reforming hydrocarbon fuel into hydrogen and carbon, using the hydrogen to produce electricity, and using the electricity to impart torque to an output shaft of a turbine.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
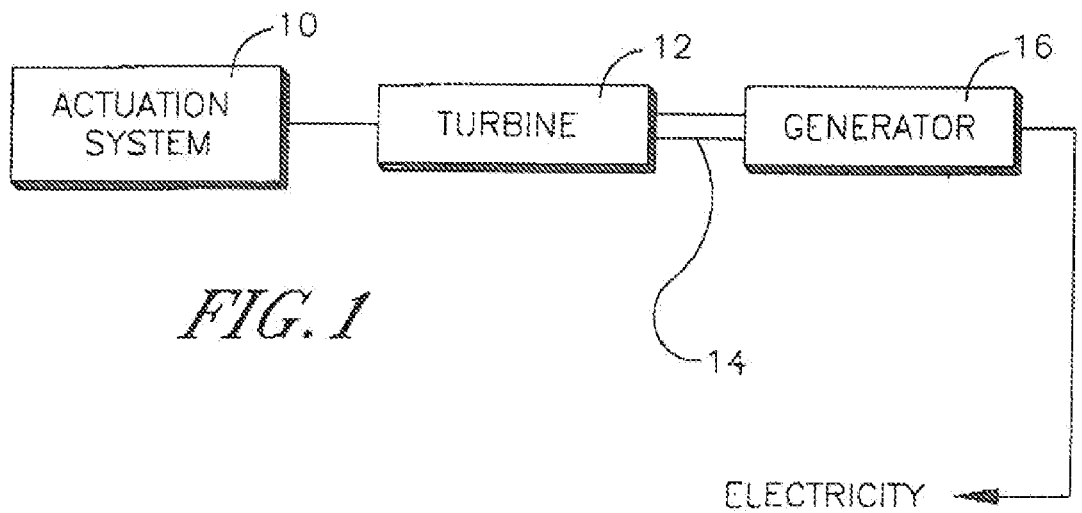
FIG. 1 is a schematic representation of a turbine-powered generator in accordance with present principles.
Figure 2:
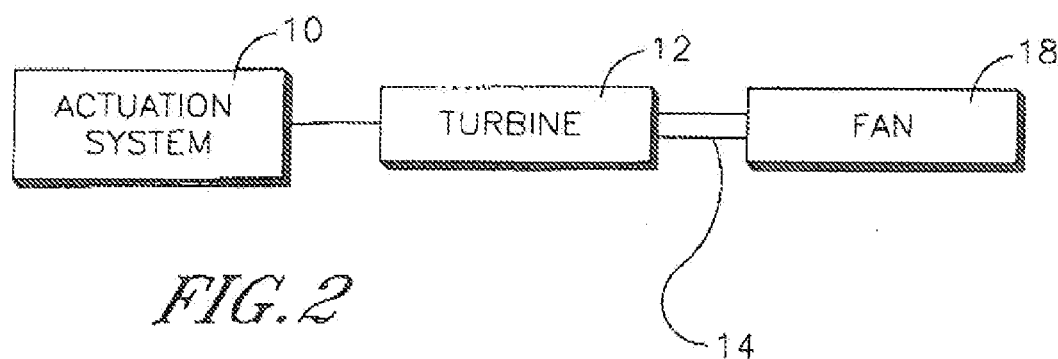
FIG. 2 is a schematic representation of a turbine-powered aircraft propulsion system in accordance with present principles.
Figure 3:
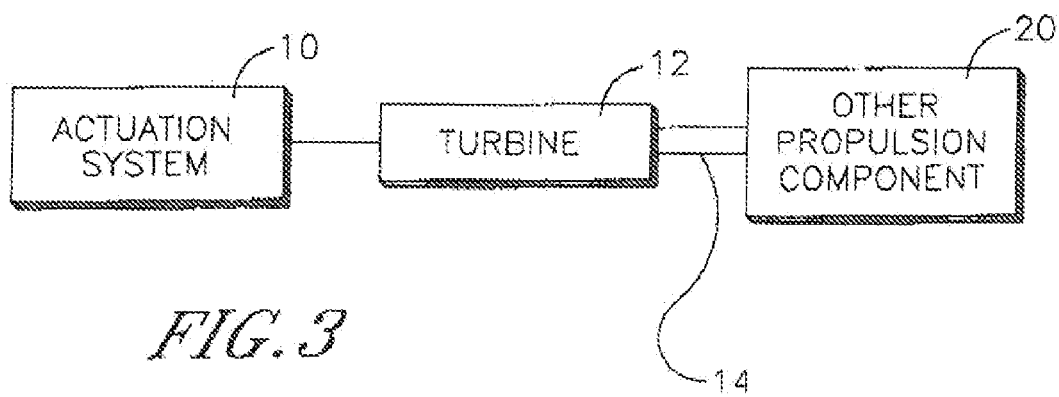
FIG. 3 is a schematic representation of a turbine-powered propulsion system for, e.g., land vehicles, helicopters, and watercraft in accordance with present principles.

FIGS. 1-3 show various illustrative non-limiting applications of present principles. An actuation system 10, described further below, imparts torque to a rotor of a turbine 12 to rotate an output shaft 14 of the turbine. The turbine 12 may include a compressor section and a turbine section in accordance with turbine principles and may also have one or more rotors or shafts which typically are coupled to each other and which may be concentric to each other.

In FIG. 1, an output shaft 14 of the turbine is coupled to the rotor of an electrical generator 16 to rotate the generator rotor within an electric field and thus cause the generator 16 to output electricity. In FIG. 2, the output shaft 14 is coupled to the rotor of an aircraft fan 18, to rotate the fan and thus cause it to generate thrust for propelling a turbofan jet plane. In FIG. 3, the output shaft 14 is coupled to the rotor of a propulsion component 20 such as the rotor of a helicopter, the shaft of a watercraft on which a propeller is mounted, or a drive shaft of a land vehicle such as a military tank to rotate the rotor/shaft/drive shaft as the case may be to propel the platform through the air or water or over land, depending on the nature of the conveyance. The propulsion component 20 may include a drive train that can include a combination of components known in the art, e.g., crankshafts, transmissions, axles, and so on.

Figure 4:
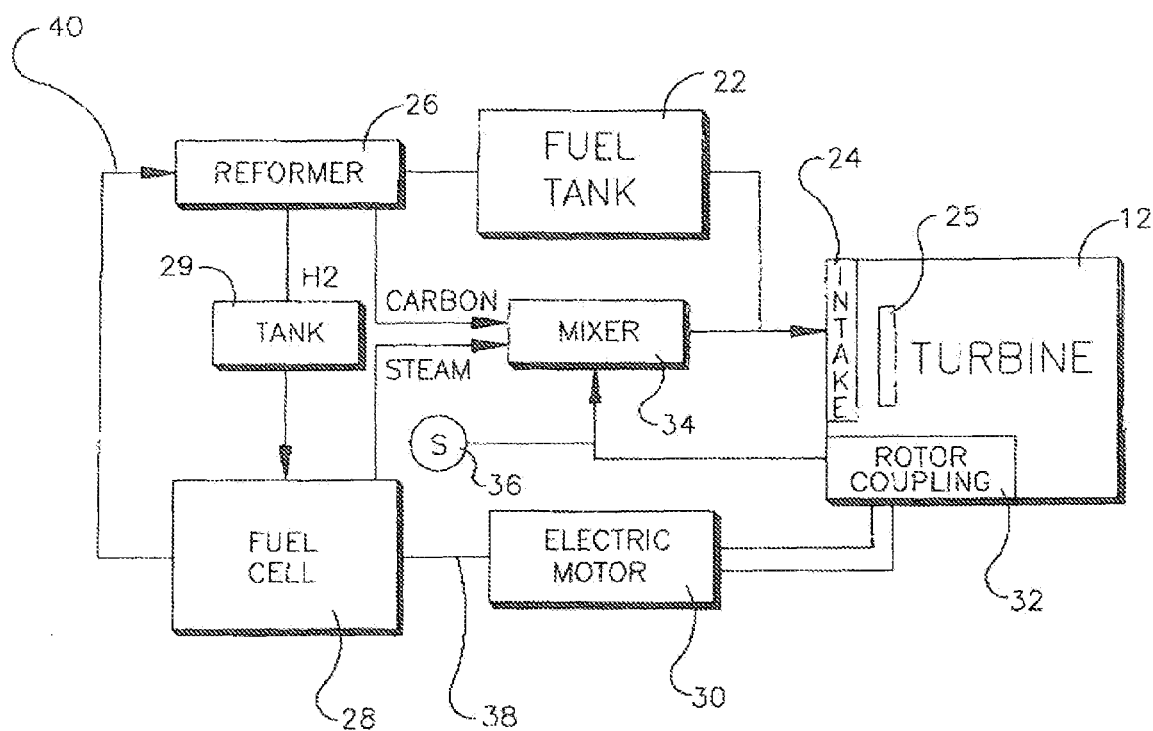
FIG. 4 is a block diagram of an example of the present actuation system.

FIG. 4 shows the details of an example embodiment of the actuation system 10. A fuel tank 22 which contains hydrocarbon-based fuel such as but not limited to jet fuel can provide fuel to the intake 24 of the turbine 12. The fuel typically is injected through injectors in the turbine, where it mixes with air compressed by the compressor section of the turbine and ignited in a so-called "flame holder" or "can". "Intake" refers generally to these portions of the turbine that are preliminary to the turbine blades. The high pressure mixture is then directed to impinge on turbine blades 25 which are coupled to the output shaft 14. In this way torque is imparted to the output shaft 14 to cause it to rotate about its axis.

In addition to or in lieu of actuating the turbine 12 with fuel directly from the fuel tank 22, the actuation system 10 may include a reformer 26 which receives fuel from the fuel tank 22. The reformer 26 produces hydrogen from the fuel, and the hydrogen is sent to a fuel cell 28, in some cases through a hydrogen tank 29 first as shown. If desired, multiple reformers and/or fuel cells may be used in parallel with each other.

The fuel cell 28 uses the hydrogen to generate electricity, typically with a relatively high efficiency, by mixing the hydrogen with oxygen from, e.g., the ambient atmosphere. Without limitation, the fuel cell 28 may be a polymer exchange membrane fuel cell (PEMFC), a solid oxide fuel cell (SOFC), an alkaline fuel cell (AFC), a molten-carbonate fuel cell (MCFC), a phosphoric-acid fuel cell (PAFC), or a direct-methanol fuel cell (DMFC).

In turn, electricity from the fuel cell 28 is sent to an electric motor 30 to cause an output shaft of the motor 30 to turn. The motor shaft is mechanically coupled through a rotor coupling 32 to a rotor of the turbine 12. Typically, the turbine rotor to which the motor 30 is coupled is not the same segment of rotor bearing the blades 25, although in some implementations this can be the case. Instead, the turbine rotor to which the motor 30 may be coupled may be a segment of the blade rotor that does not bear blades or a rotor separate from the blade rotor and concentric therewith or otherwise coupled thereto. In any case, the motor 30, when energized by the fuel cell 28, imparts torque (through appropriate couplings if desired) through a turbine rotor to the output shaft 14 of the turbine 12, which in some cases may be the same shaft as that establishing the turbine rotor.

In addition, to realize further efficiencies, water in the form of steam produced by the fuel cell 28 may be mixed with carbon from the reformer 26 in a mixer 34, which may be a tank or simple pipe or other void in which the water and carbon can mix, with the mixture then being directed (through, e.g., appropriate piping or ducting) to the turbine intake 24. If desired, surfactant from a surfactant tank 36 may also be added to the steam/carbon mixture. In any case, it may now be appreciated that the steam/carbon mixture may supplement fuel injection directly from the fuel tank 22 to the turbine intake 24, or replace altogether fuel injection directly from the fuel tank 22 to the turbine intake 24.

Still further, as indicated by the electrical line 38 in FIG. 4, electricity produced by the fuel cell 28 may be used not only to actuate the electric motor 30 but also to provide ignition current for the appropriate components in the turbine intake 24. In cases where the reformer 26 generates carbon dioxide and steam, these fluids may also be directed to the intake 24 directly from the reformer 26 or through the mixer 34.

In some embodiments, water can be returned from the fuel cell 28 if desired to the reformer 26 through a water line 40. Also if desired, heat from the turbine 12 may be collected and routed back to the reformer 26 through ducting/piping, to heat the reformer.

While the particular ENHANCED EFFICIENCY TURBINE is herein shown and described in detail, the scope of the present application is limited only by the appended claims.

What is claimed is:

1. A system comprising:
   at least one reformer assembly receiving hydrocarbon fuel and outputting hydrogen from a first output and product depleted of hydrogen from a second output separate from the first output outputting hydrogen;
   at least one fuel cell receiving hydrogen from the first output of the reformer but not being connected to the second output of the reformer, the fuel cell providing a first energy output and an output of water vapor;
   the water vapor being mixed with product from the second output of the reformer to provide a mixture; and
   the mixture being directed into a turbine to impart torque to the turbine.

2. The system of claim 1, wherein the mixture further includes a surfactant.

3. The system of claim 1, wherein the output shaft of the turbine is coupled to a generator to cause the generator to output electricity when the output shaft is rotated.

4. The system of claim 1, wherein the turbine propels a vehicle to move.

5. The system of claim 1, wherein the first energy output of the fuel cell is connected to an electric motor and the electric motor is coupled to a rotor coupling of the turbine, the first energy output actuating the electric motor.

6. The system of claim 1, wherein the hydrocarbon fuel is provided to an intake of the turbine in addition to being provided to the reformer.

7. The system of claim 1, wherein the fuel cell is electrically connected to a turbine ignition component to provide ignition energy thereto.

8. A system comprising:
   at least one turbine including an output shaft;
   at least one fuel cell providing output that is coupled to the turbine so as to impart torque to the output shaft;
   at least one reformer receiving hydrocarbon fuel and outputting, from a first output, hydrogen, and from a second output, product depleted of hydrogen separate from the hydrogen from the first output;
   the fuel cell receiving hydrogen output by the first output of the reformer but not product output by the second output of the reformer, wherein the fuel cell produces vapor, the vapor being mixed with product depleted of hydrogen output by the reformer to provide a mixture, the mixture being directed to a turbine to impart torque to the turbine.

9. The system of claim 8, wherein the fuel cell is electrically connected to an electric motor to actuate the electric motor.

10. The system of claim 8, wherein fluid or steam produced by the fuel cell is directed to an intake of the turbine.

11. The system of claim 8, wherein the system provides hydrocarbon fuel to an intake of the turbine in addition to providing the hydrocarbon fuel to a reformer supplying hydrogen to the fuel cell.

12. The system of claim 8, wherein the fuel cell is electrically connected to a turbine ignition component to provide ignition energy thereto.

* * * * *